Jan. 11, 1938.     C. G. FINK     2,104,741
PROCESS FOR HALOGENATION OF MATERIALS
Filed Oct. 25, 1935
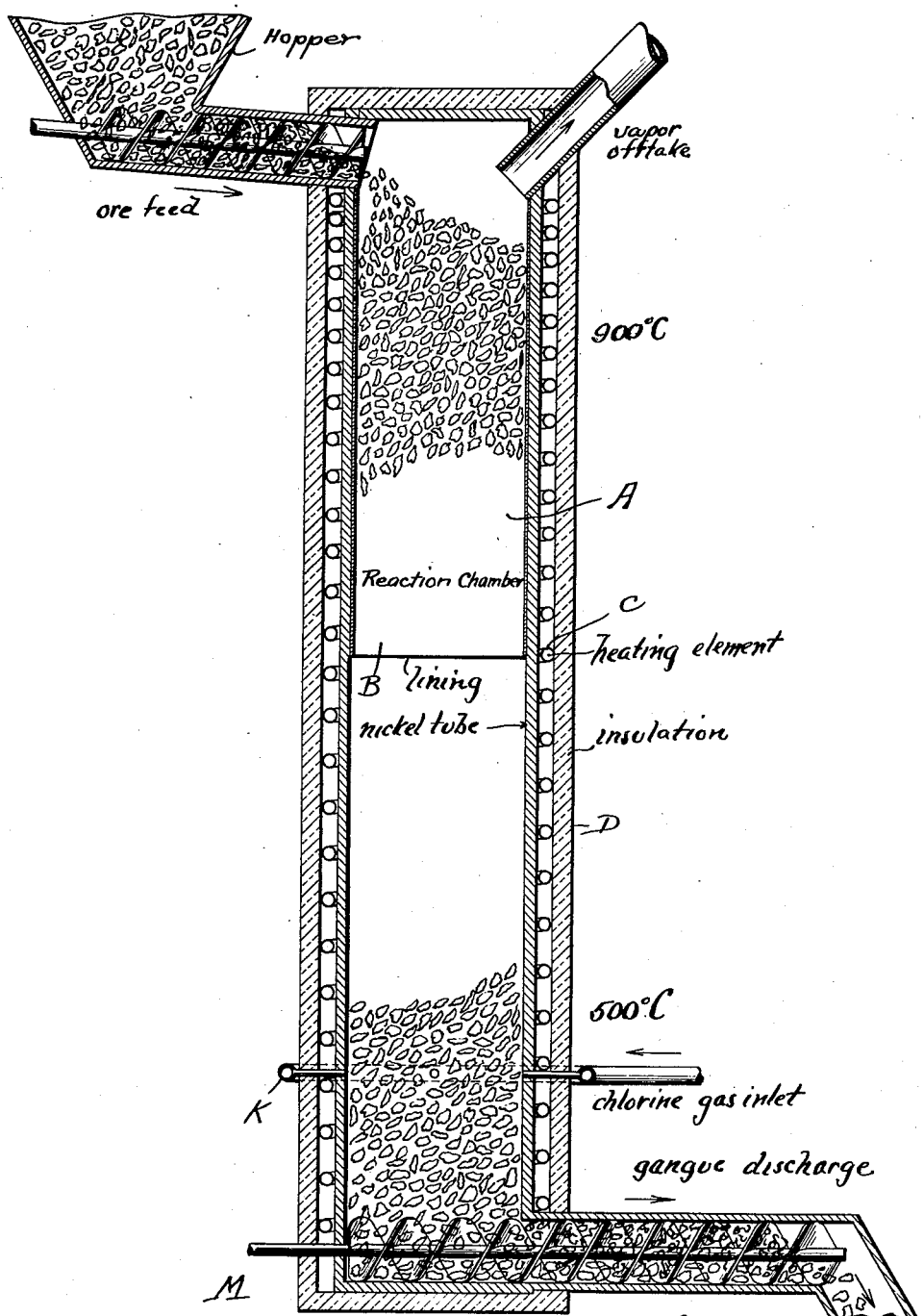

Patented Jan. 11, 1938

2,104,741

UNITED STATES PATENT OFFICE 2,104,741

PROCESS FOR HALOGENATION OF MATERIALS

Colin G. Fink, New York, N. Y.

Application October 25, 1935, Serial No. 46,818

8 Claims. (Cl. 75—112)

This invention relates to the halogenation of materials, and its nature, objects and advantages will be understood from the following.

While there are a number of materials available to the chemical industry which will resist highly corrosive gases such, for example, as sulphuric acid, nitric acid and hydrofluoric acid, no material satisfactory for industrial use has been known which will withstand the corrosive action of gaseous chlorine, especially at elevated temperatures. The other halogens present the same problem. I am aware that quartz or fused silica has been used for apparatus to contain gaseous chlorine, but, from an industrial viewpoint, this is not practical not only because of its high cost and susceptibility to breakage, but also because of its short life in use. Carefully dried liquid chlorine has been handled in iron containers, and at low temperatures solutions containing gaseous chlorine have been handled in rubber-lined containers. However, the only material that has been usable so far to contain chlorine at elevated temperatures has been quartz or fused silica.

The present invention is based upon the idea of using, for a container or reaction chamber, or for a lining thereof, a metal, the halogen compound of which is unstable at the temperature at which the halogenation process is carried out. The metal used for the container must also have a melting-point above the dissociation-point of its halogen compounds in the presence of an excess of the halogen.

According to the present invention a metal is selected for the reaction chamber in which the halogenation is to be performed, the halide of which is completely dissociated into chlorine and the metal or base at a temperature below the reaction-chamber temperature (so that a halogen compound is not formed), and the reaction carried on above that temperature.

Data concerning the dissociation temperatures of halogen compounds is incomplete and inexact. Although the standard reference books such as the International Critical Tables, and Landolt & Bornstein supply data as to the heats of formation and boiling points of various halides, the information as to dissociation temperatures of the halides is meager. However, as the result of my discoveries and observations I am able to give concrete examples of the practice of my invention, and to state the principles thereof. To state all cases and applications of the principle of my invention will require the determination of some undetermined physical constants of the halogen compounds, but my invention points to the determination of such physical constants and to the applicability of any metal as a material for a reaction-chamber for carrying on any particular halogenation process or for a condenser maintained at elevated temperature and exposed to chlorine gas or metal halides. However a table of the "Heats of Formation" of the halogen compounds and of metals is a guide to the selection of a metal for the reaction chamber.

The affinity of chlorine for example, for different metals varies widely and may be conveniently expressed by the heat of formation of the metal chlorine compound, as follows:

| | Cal./unit wt. of chlorine gas |
|---|---|
| $BeCl_2$ | 1585 |
| $AlCl_3$ | 1565 |
| $CrCl_2$ | 1403 |
| $FeCl_2$ | 1153 |
| $NiCl_2$ | 1058 |
| $CoCl_2$ | 1080 |
| $CuCl$ | 915 |
| $FeCl_3$ | 904 |
| $AgCl$ | 852 |
| $PdCl_2$ | 613 |
| $PtCl_2$ | 505 |
| $PtCl$ | 471 |
| $PtCl_4$ | 440 |
| $AuCl_3$ | 253 |
| $AuCl$ | 29 |

It will be observed that the affinity of the base metals such as Al and Fe is comparatively high, whereas the affinity of the noble metals is, in contrast, very small. Furthermore, the affinity of the noble metals for chlorine decreases rapidly with elevation in temperature. For example, although gold can be made to react with chlorine at temperatures not far above the boiling point of water, at temperatures about 300° C. or above, it is difficult if not almost impossible to get chlorine to interact with gold.

My invention has been practiced in the halogenation of beryl in the process of recovering beryllium, which practice will be now described as a representative example of the process and apparatus according to the present invention.

An example of apparatus for use in conjunction with the process is illustrated in the accompanying drawing, which is a vertical sectional view, and the description will be aided by reference to said drawing. On the drawing A designates the reaction chamber, which in the example is a nickel tube having a lining B of gold. C designates an electrical heating element around the tube A, and an insulating jacket D surrounds the heating element. F designates a hopper from which ore is fed into the reaction chamber by means of a screw conveyor G. I is a tube communicating with the upper part of the reaction chamber, and takes off vaporized metal halides to be later condensed. K designates tuyères communicating with the tube A at a lower part thereof, and through which chlorine gas is introduced into the tube A. A screw conveyor M at the base of the tube A serves to remove the gangue of the ore.

Beryl ($Be_3Al_2Si_6O_{18}$), an ore of beryllium, preferably in a coarse ground condition is put or fed into the reaction chamber and chlorine gas passed through the same. The reaction chamber is of gold, or of another metal (nickel for example) lined with gold. In order that a metal may be serviceable at elevated temperatures for chlorine apparatus the melting point of the metal should be relatively high. The melting point of gold is 1062° C. Also the vapor tension of the metal should be relatively low at elevated temperatures and the boiling point of the metal should be relatively high. The boiling point of gold is 2600° C. Finally it is preferable that the boiling point of the chloride of the metal be relatively high and that the solubility of the metal chloride in chlorine gas be relatively slight. Gold is one of the most suitable metals for the purpose.

The heat of formation of gold chloride indicates that the affinity of chlorine for gold is small. The dissociation temperature of $AuCl_3$ is given in Kay & Labby's "Physical and Chemical Constants" as 180° C. and elsewhere as 254° C. As the dissociation is from $AuCl_3$ to a chloride in which gold has a lower valence (probably $AuCl_2$), a temperature must be found at which the gold is unstable as regards any chlorine compound, i. e. at which a chloride of gold is not formed. While I have not definitely established the exact temperature where the chloride does not form, I have found that if the gold is heated to a temperature of about 300° C. or above, chlorine does not interact with gold, or if it does, only to a negligible extent. The temperature of the reaction chamber however is maintained above 300° C. in the example of the process chosen, because it is desired to volatilize the beryllium chloride ($BeCl_2$) which is formed, and have it pass off, to be afterwards condensed. The boiling point of beryllium chloride is given as 520° C. and at 750° to 800° C. beryllium oxide (in the beryl) readily reacts with chlorine, or with phosgene ($COCl_2$). At 1200° C. the reaction is violent. I have therefore chosen a temperature of 900° C. for the reaction chamber as most suitable.

The reaction chamber is brought to the temperature chosen (900° C.) for carrying on the process in any suitable manner. The reaction-chamber may be surrounded by a heating-coil of resistance wire and insulation provided around the heating-coil. While the reaction chamber is being raised to the 900° C. temperature it is preferably supplied with air or nitrogen, or a mixture thereof, or other gas which is inert toward the gold.

The ore (beryl) is conveniently fed to the reaction chamber through a hopper provided with a feed-screw.

Chlorine-gas (preferably dry) is supplied to the reaction chamber at a point in the lower part thereof. The chlorine-gas rising through the ore (beryl) reacts with the beryllium forming beryllium chloride ($BeCl_2$) which, at the temperature existing in the reaction chamber (900° C.) passes off through the offtake as gaseous $BeCl_2$.

The gaseous $BeCl_2$ after passing off from the reaction chamber may be condensed, taking the form of a fluffy crystalline mass of $BeCl_2$. The gangue from the ore, may be removed through the bottom of the apparatus, as by means of a feed-screw extending through a discharge opening.

To obtain the metal beryllium, the beryllium chloride crystals may be fused and the metal separated by electrolysis or by precipitation, or in any other suitable or well known method.

The aluminum in the ore (beryl) is also attacked by the chlorine, and as aluminum chloride ($Al_2Cl_6$) has a boiling point of 180° C., it will also pass off from the reaction chamber as a gas. The aluminum chloride may be separated from the beryllium chloride in any suitable manner, as by fractional condensation.

Because of the cost, it is desirable, although not necessary, to employ a combination of metals for the apparatus. In this connection nickel is useful, for nickel, if heated to high temperatures and then brought into contact with chlorine, will resist the attack of chlorine for a relatively long period of time due to the high boiling point of the nickel chloride—approximately 1000° C.—as compared with a much lower boiling point of iron chloride ($FeCl_3$)—315° C.

I have found that apparatus operated under the conditions above stated shows no appreciable loss of gold. The combination of a nickel base and a gold lining is, of course, not only much cheaper than the use of solid gold but provides a mechanically stronger device per unit of weight, at elevated temperatures.

With bromine the reaction on the beryl ore may be carried out at a lower temperature than for chlorine. In carrying out bromination, carbon is mixed with the ore.

With fluorine, the reaction on beryl may be carried out under substantially the same conditions as with chlorine.

From my experience with the behavior of platinum metal and tungsten metal at elevated temperatures the halides thereof are unstable and the halogen compounds do not form, and these are indicated as particularly suitable for use as metallic containers in which halogenation is carried on at elevated temperatures.

It is of course, to be understood that the principle of my invention is capable of a number of applications other than the particular one above described and with other gases.

The selection of any particular metal for use in a halogen process may be made by following the principles disclosed in the particular example given above, by comparing the heat of formation of the halogen compound of the metal to be used for the container with the heat of formation of the halogen compound of the metal to be recovered from the ore of process starting-material; and by determinations of the temperature at which the metal under consideration for use as a container does not form a compound or compounds with a halogen or the several halogens, and of the reaction-temperature and boiling point of the halogen-compound (or compounds) of the metal to be recovered. Of further aid would be determinations of the melting point, vapor tension, and boiling-point of the metal for use as the container.

A metal which does not combine with a halogen at the temperature required for the halogenation of another metal, is suitable for use in the process as a container. It is desirable that the temperature of the reaction be above the boiling-point of the halide of the metal to be recovered, but this is not essential, as the halide can be separated in other ways than by vaporization and subsequent condensation.

What is claimed is:

1. The process of halogenating materials in a vessel having a metal reacting with a halogen at relatively low temperatures but not at operating temperatures, which comprises heating such metal and the charge to above said reacting temperatures and then introducing the halogen as a gas to react with the charge.

2. The process of chlorinating materials in a vessel having a metal reacting with chlorine at relatively low temperatures but not at operating temperatures which comprises heating such metal to above said reacting temperatures and then introducing the chlorine gas to react with the charge.

3. In a process of halogenating materials in metallic containers, the container comprising a metal the halide of which dissociates below the melting point of the metal, maintaining the container at a temperature above the aforesaid dissociation temperature of the halide of the metal of the container, and then introducing the halogen into the container and continuing its action on the material therein to be acted on.

4. In a process of halogenating materials in metallic containers, the container comprising a metal the halide of which dissociates below the melting point of the metal, maintaining the container at a temperature above the aforesaid dissociation temperature of the halide of the metal of the container and above the boiling point of the halogen compound resulting from the action of the halogen on the material to be acted on in the container, and then introducing the halogen into the container and continuing its action on.

5. A process according to claim 3, wherein the container-material exposed to the halogen gas is gold.

6. A process according to claim 3, wherein chlorine is used.

7. A process according to claim 3, wherein an ore of beryllium is placed in said container and subjected to the action of the halogen.

8. A process according to claim 3, wherein an ore of beryllium is placed in said container and subjected to the action of the halogen at a temperature above the boiling point of the beryllium-halide which is formed.

COLIN G. FINK.